US012801059B2

(12) United States Patent
Imanaka et al.

(10) Patent No.: US 12,801,059 B2
(45) Date of Patent: Nov. 17, 2026

(54) CHARGING ROLLER, PROCESS CARTRIDGE, IMAGE FORMING APPARATUS, AND IMAGE FORMING METHOD

(71) Applicant: KYOCERA Document Solutions Inc., Osaka (JP)

(72) Inventors: Yoshitaka Imanaka, Osaka (JP); Kota Katsuki, Osaka (JP); Keiji Ozawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/260,010

(22) Filed: Jul. 3, 2025

(65) Prior Publication Data

US 2026/0010091 A1 Jan. 8, 2026

(30) Foreign Application Priority Data

Jul. 8, 2024 (JP) ................................ 2024-109727

(51) Int. Cl.

| | |
|---|---|
| ***G03G 15/02*** | (2006.01) |
| ***G03G 5/05*** | (2006.01) |
| ***G03G 5/087*** | (2006.01) |
| ***G03G 21/18*** | (2006.01) |

(52) U.S. Cl.

CPC ....... *G03G 15/0233* (2013.01); *G03G 5/0571* (2013.01); *G03G 5/087* (2013.01); *G03G 21/1814* (2013.01)

(58) Field of Classification Search

CPC ............... G03G 15/0233; G03G 5/047; G03G 21/1814; G03G 5/087; G03G 5/0507

See application file for complete search history.

(56) References Cited

U.S. PATENT DOCUMENTS

| | | | | |
|---|---|---|---|---|
| 6,221,948 | B1 * | 4/2001 | Yamaguchi | G03G 15/1685 524/544 |
| 2013/0316275 | A1 * | 11/2013 | Kawasaki | G03G 5/144 430/63 |
| 2014/0294443 | A1 * | 10/2014 | Klenkler | G03G 21/0011 399/346 |

FOREIGN PATENT DOCUMENTS

JP 5381028 B2 1/2014

* cited by examiner

*Primary Examiner* — Jessica L Eley
(74) *Attorney, Agent, or Firm* — Stein IP, LLC

(57) ABSTRACT

A charging roller includes a conductive shaft, an elastic body layer formed on an outer periphery of the conductive shaft, and a surface layer formed on an outer periphery of the elastic body layer. The surface layer contains a binder resin and conductive particles. The binder resin contains only a thermoplastic resin. The conductive particles contain first conductive particles and second conductive particles. The first conductive particles are carbon black particles. A particle size distribution of the conductive particles has at least one peak within a range of not less than 0.01 μm but not more than 1 μm. A water contact angle x of the thermoplastic resin and a content y of the first conductive particles in the conductive particles satisfy the following expressions: 40≤y, y≤(800/27)x+(280/9), and y≤−8x+200.

12 Claims, 4 Drawing Sheets

CHARGING ROLLER, PROCESS CARTRIDGE, IMAGE FORMING APPARATUS, AND IMAGE FORMING METHOD

INCORPORATION BY REFERENCE

This application is based on and claims the benefit of priority from Japanese Patent Application No. 2024-109727 filed on Jul. 8, 2024, the entire contents of which are hereby incorporated by reference.

BACKGROUND

The present disclosure relates to a charging roller, a process cartridge, an image forming apparatus, and an image forming method.

Image forming apparatuses using an electrophotographic method use a charging device in order to charge an image bearing member. A charging roller has been widely used as the charging device.

SUMMARY

A charging roller disclosed herein includes a conductive shaft, an elastic body layer formed on an outer periphery of the conductive shaft, and a surface layer formed on an outer periphery of the elastic body layer. The surface layer contains a binder resin and conductive particles. The binder resin contains only a thermoplastic resin. The conductive particles contain first conductive particles and second conductive particles. The first conductive particles are carbon black particles. A particle size distribution of the conductive particles has at least one peak within a range of not less than 0.01 μm but not more than 1 μm. A water contact angle of the thermoplastic resin and a content of the first conductive particles in the conductive particles satisfy expressions (1) to (3).

$$40 \leq y \tag{1}$$

$$y \leq (800/27)x + (280/9) \tag{2}$$

$$y \leq -8x + 200 \tag{3}$$

In the expressions (1) to (3), y denotes the water contact angle of the thermoplastic resin, and x denotes the content of the first conductive particles in the conductive particles.

A process cartridge disclosed herein is detachably attached to an image forming apparatus. The process cartridge disclosed herein includes the above-described charging roller.

An image forming apparatus disclosed herein includes an image bearing member, a charging device configured to charge a surface of the image bearing member, an exposure device configured to expose the charged surface of the image bearing member and to form an electrostatic latent image on the surface of the image bearing member, a development device configured to develop the electrostatic latent image as a toner image, and a transfer device configured to transfer the toner image from the image bearing member to a transfer target. The charging device is the above-described charging roller.

An image forming method disclosed herein is an image forming method including a charging step of charging a surface of an image bearing member by a charging device. The charging device is the above-described charging roller.

This and other objects of the present disclosure, and the specific benefits obtained according to the present disclosure, will become apparent from the description of embodiments which follows.

DETAILED DESCRIPTION

Figure 1:
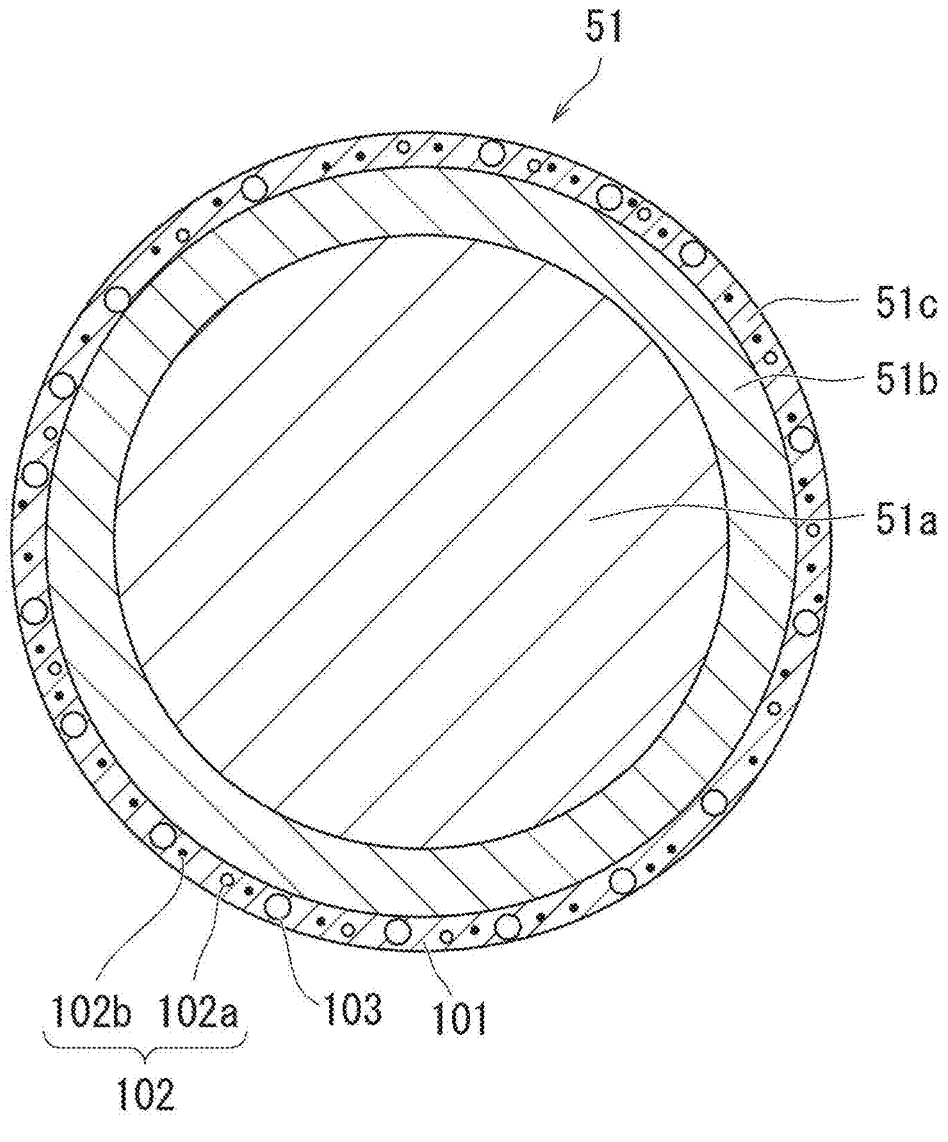
FIG. 1 is a cross-sectional diagram illustrating an example of a charging roller according to a first embodiment disclosed herein.

Embodiments according to the present disclosure will be described below, but first, problems of the prior art will be described.

When a charging roller cannot uniformly charge a surface of an image bearing member, image defects called uneven discharge (e.g., uneven density, such as spotted unevenness or lateral streaked unevenness) occur.

Therefore, the charging roller is required to be able to suppress the occurrence of such uneven discharge caused by charging defects in the surface of the image bearing member. Moreover, the charging roller is required to have a low electrical resistance (rotational resistance) of the charging roller.

As an example of a conventional charging device capable of preventing charging defects and suppressing the occurrence of the uneven discharge, a charging roller has been proposed including a shaft body, an elastic body layer provided on an outer periphery of the shaft body, and a surface layer provided on an outer periphery of the elastic body layer, the surface layer being formed of insulating particles and a resin film in which the insulating particles are dispersed.

However, it is difficult to say that the occurrence of discharge unevenness can be sufficiently suppressed even when the above-described conventional charging device (charging roller) is used.

The following describes embodiments according to the present disclosure. However, the present disclosure is not limited to the following embodiments. The present disclosure may be modified in various ways within the scope of the object of the present disclosure, and embodiments obtained by appropriately combining technical means described in different embodiments are also included within the technical scope of the present disclosure.

Hereinafter, the term "-based" may be appended to the name of a chemical compound in order to form a generic name encompassing both the chemical compound itself and derivatives thereof. When the term "-based" is appended to the name of a chemical compound used in the name of a polymer, the term indicates that a repeating unit of the polymer originates from the chemical compound or a derivative thereof. Note that unless otherwise stated, evaluation results (e.g., values indicating shape or physical properties) of a powder are a number average of values measured for each of an appropriate number of particles of the powder. The particle diameters of various particles (e.g., first conductive particles, second conductive particles, and resin particles) described in the embodiments refer to equivalent circle diameters measured using a scanning electron microscope. The term "(meth)acryl" may be used as a generic term for both acryl and methacryl comprehensively. The "main component" of a material means a component most abundant in the material in terms of mass unless otherwise stated. Moreover, each component described herein may be used alone or in combination of two or more. Moreover, the expression "at least one of A and B" as used herein means "A and/or B". The expression "A and/or B" as used herein means "A or B, or A and B". Moreover, in this specification, the expression "A to B", which is described herein as a numerical value range, means "not less than A and not more than B".

First Embodiment: Charging Roller

The following describes a charging roller according to a first embodiment disclosed herein. The charging roller according to the present embodiment includes a conductive shaft, an elastic body layer formed on an outer periphery of the conductive shaft, and a surface layer formed on an outer periphery of the elastic body layer. The surface layer contains a binder resin and conductive particles. The binder resin contains only a thermoplastic resin. The conductive particles contain first conductive particles and second conductive particles. The first conductive particles are carbon black particles. A particle size distribution of the conductive particles has at least one peak within a range of not less than 0.01 μm but not more than 1 μm (in other words, not less than 10 nm but not more than 1000 nm). A water contact angle of the thermoplastic resin and a content of the first conductive particles in the conductive particles satisfy expressions (1) to (3).

$$40 \leq y \tag{1}$$

$$y \leq (800/27)x + (280/9) \tag{2}$$

$$y \leq -8x + 200 \tag{3}$$

In the expressions (1) to (3), y denotes the water contact angle of the thermoplastic resin described above, and x denotes the content (mass percentage) of the first conductive particles in the conductive particles described above.

The charging roller according to the present embodiment can sufficiently suppress an occurrence of uneven discharge by including the above-described configuration. Moreover, the charging roller according to the present embodiment has a low rotational resistance by including the above-described configuration. The reason why the charging roller according to the present embodiment produces the above-described advantageous effects is presumed as follows.

The charging roller according to the present embodiment contains the thermoplastic resin, the first conductive particles, and the second conductive particles in the surface layer. As the binder resin, thermosetting resins are generally used. The thermosetting resins have high viscoelasticity and can improve its breaking strength by being cured. However, there is a trade-off relationship between hardness and hygroscopicity of the resin. The thermosetting resins have a high ratio of polar groups and high environmental dependency. The charge transport capacity of the thermosetting resins changes greatly with humidity, and uneven discharge is likely to occur. According to an investigation of the present inventors, even when a thermoplastic resin is used as the binder resin, sufficient strength can be applied to the charging roller to prevent defects of the charging roller. In addition, since no thermosetting resin is used, uneven discharge caused by environmental changes can be suppressed. Note that when the binder resin contains even a small amount of a thermosetting resin, the binder resin is thermally cured. Therefore, in the present embodiment, only the thermoplastic resin is used as the binder resin.

Figure 4:
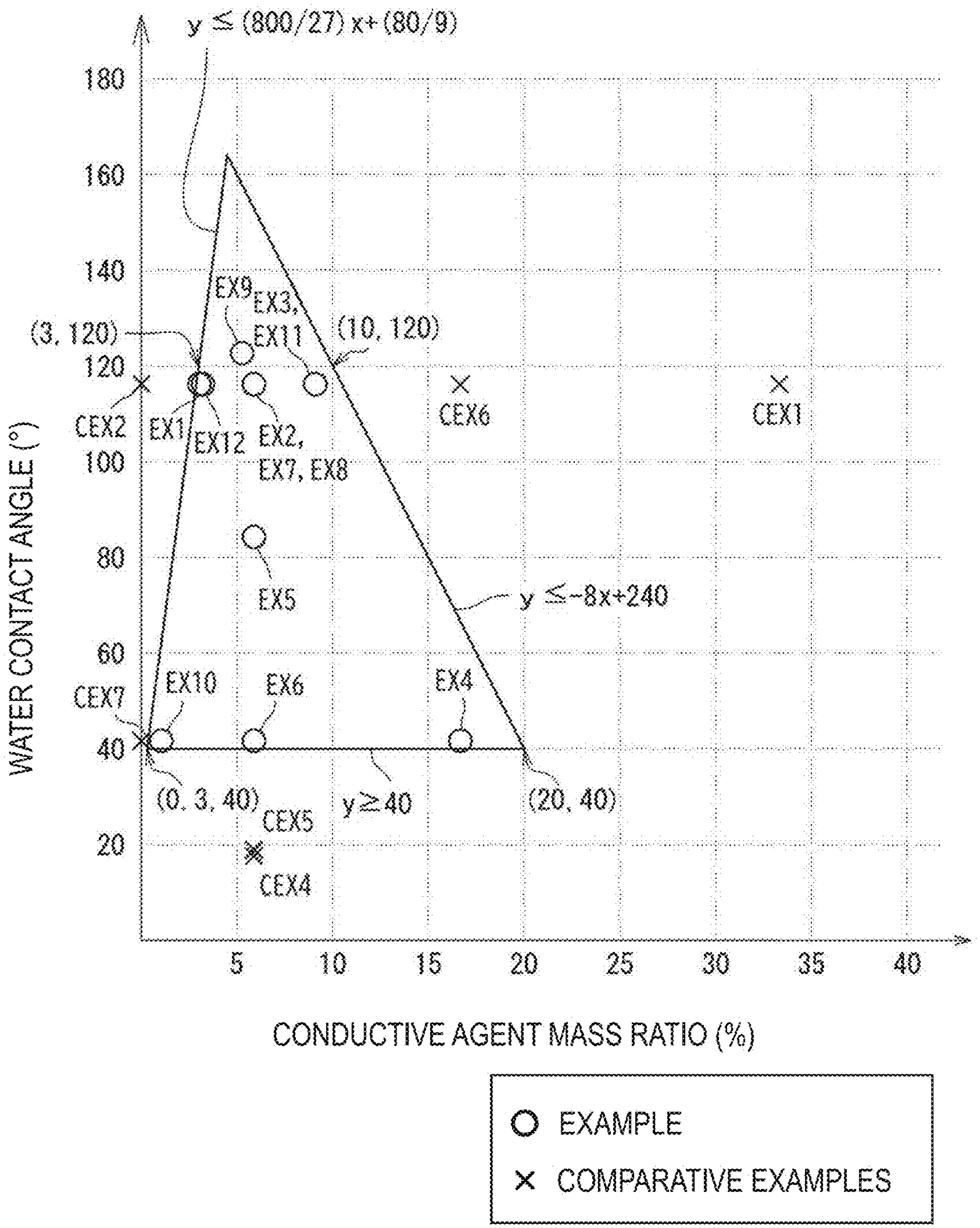
FIG. 4 is a graph illustrating a relationship between a content of first conductive particles in conductive particles in a surface layer of each charging roller manufactured by Examples and a part of Comparative Examples and a water contact angle of a binder resin in the surface layer of each charging roller described above.

In particular thermoplastic resins having a water contact angle of not less than 40° but less than 180° have a low water absorption rate and can suppress electrical conduction (ionic conduction by the binder resin) in portions other than the conductive particles that occurs when the binder resin absorbs water. As a result, uneven discharge can be effectively suppressed. Moreover, since the thermoplastic resin having a water contact angle of not less than 40° but less than 180° dissolves in alcohol, such as methanol, it is possible to form the surface layer by applying a solution. Therefore, such a thermoplastic resin has excellent processability and dispersibility of conductive particles, and can effectively suppress uneven discharge. When the water contact angle of the thermoplastic resin and the content of the first conductive particles in the conductive particles satisfy the expressions (1) to (3), the water contact angle of thermoplastic resin is less than 180° (specifically, not more than 20840/127° (≈164°), from the expressions (2) and (3)), as illustrated in FIG. 4 listed below.

Conductive particles (first conductive particles and second conductive particles) before mixing are generally aggregated. When the conductive particles are sufficiently cracked and are sufficiently dispersed in the surface layer, the particle size distribution of the conductive particles has a peak within a range of not less than 0.01 μm but not more than 1.00 μm. When the first conductive particles and the second conductive particles are both ideally dispersed in the surface layer, the particle size distribution of the conductive particles has two peaks within the range of not less than 0.01 μm but not more than 1.00 μm. However, it can be said that when the particle size distribution of the conductive particles has at least one peak within the range of not less than 0.01 μm but not more than 1.00 μm, the conductive particles are sufficiently disintegrated and are sufficiently dispersed in the surface layer. Therefore, when the particle size distribution of the conductive particles has a peak within the range of not less than 0.01 μm but not more than 1.00 μm, the conductive particles are in a state of being sufficiently dispersed in the surface layer, and uneven discharge can be effectively suppressed.

The peak in the particle size distribution of the conductive particles can be verified by measuring the particle size distribution of the conductive particles in the surface layer forming solution used to form the surface layer using a laser diffraction type particle size distribution analyzer, before the surface layer is formed. When the particle size distribution of the conductive particles in the surface layer forming solution has a peak within the range of not less than 0.01 μm but not more than 1 μm, it is possible to form the surface layer having the particle size distribution of the conductive particles having the peak within the range of not less than 0.01 μm but not more than 1.00 μm. Therefore, it can be considered that when the particle size distribution of the conductive particles in the surface layer forming solution has a peak within the range of not less than 0.01 μm but not more than 1.00 μm, the particle size distribution of the conductive particles in the surface layer has the peak within the range of not less than 0.01 μm but not more than 1.00 μm. Note that since only the thermoplastic resin is used for the binder resin, the particle size distribution of the conductive particles in the surface layer may be measured by melting the surface layer to be dispersed in, for example, a solvent used in the surface layer forming solution. For example, "SALD-2300" produced by Shimadzu Corporation can be used for the laser diffraction type particle size distribution analyzer.

Moreover, the charging roller according to the present embodiment contains the carbon black particles as the first conductive particles in the surface layer. The carbon black particles are electronic conductors (electronic conductive agents). When the water contact angle of the binder resin is low and the water absorption rate of the binder resin is high, sufficient electric charge flows to the charging roller even in the case of ionic conduction. However, when the water contact angle of the binder resin is high and the water absorption rate of the binder resin is low, in order to flow the electric charge sufficiently to the charging roller, it is desirable for the surface layer to have the electron conductivity. When the surface layer contains the conductive particles having the electron conductivity, the electrical resistance of the surface layer can be reduced, and the rotational resistance of the charging roller can be reduced, thereby obtaining favorable electrical response.

However, the lower the rotational resistance of the charging roller, the greater the likelihood of uneven discharge. Moreover, when the thermoplastic resin having the water contact angle within the range of not less than 40° but less than 180° and low water absorption rate is used as the binder resin as described above, if the energy gap between the ionic conduction caused by the binder resin absorbing water and the electronic conduction caused by the conductive particles becomes too large, the electric charge may flow only partially, and the rotational resistance of the charging roller may become high instead.

The carbon black particles have electrical conductivity between ionic conductivity and electronic conductivity, and are particularly suitable for mediating an exchange of electric charges between the binder resin and the second conductive particles. Moreover, the surface area of the conductive particles, particularly the surface area of the carbon black particles, has a large effect on the resistance of the surface layer. Electric charge flows through the binder resin due to ionic electrical conduction, and electric charge flows through the conductive particles (carbon black particles, metal oxide particles) due to electronic conduction. When electric charge is transferred between the binder resin and the metal oxide particles, an energy gap occurs due to a difference in the conductive mechanisms therebetween, and the resistance increases. It is considered that the carbon black particles have an effect of mitigating the increase in the resistance that occurs due to the difference in the conductive mechanisms, and therefore the need to be compounded to electrical conductive systems of mixed ionic and electronic conductivity. However, compatibility between the carbon black particles and the binder resin is not good, and therefore the compatibility deteriorates as the water absorbency of the binder resin decreases. If the compatibility is poor, the carbon black particles are more likely to aggregate, which can lead to uneven discharge (measured values are more likely to decrease). For this reason, there is an upper limit to the amount of carbon black particles that can be compounded, and the lower the hygroscopicity of the binder resin, the lower the upper limit becomes.

Therefore, in the charging roller according to the present embodiment, a plurality of types of conductive particles containing the carbon black particles as first conductive particles and second conductive particles other than the carbon black particles are compounded in the surface layer as conductive particles so that the content of the carbon black particles and the water contact angle of the thermoplastic resin in these conductive particles satisfy the expressions (1) to (3).

This makes it possible to appropriately reduce the resistance of the surface layer, to improve the electrical response, and to sufficiently suppress the occurrence of uneven discharge.

The charging roller according to the present embodiment is suitable as a charging roller used for an image forming apparatus using a one-component developer (specifically, a magnetic one-component developer or a non-magnetic one-component developer) or a charging roller used for an image forming apparatus using a two-component developer.

The following describes an example of the charging roller according to the present embodiment with reference to FIG. 1. FIG. 1 is a cross-sectional diagram illustrating a charging roller 51, which is an example of the charging roller according to the present embodiment. The charging roller 51 is a cylindrical member. The charging roller 51 includes a conductive shaft 51*a*, an elastic body layer 51*b*, and a surface layer 51*c*. The elastic body layer 51*b* covers an outer peripheral surface of the conductive shaft 51*a*. The surface layer 51*c* covers an outer peripheral surface of the elastic body layer 51*b*. The charging roller 51 has an outer diameter of, for example, not less than 5 mm but not more than 20 mm. The structure of the charging roller 51 according to the present embodiment has been described above with reference to FIG. 1.

However, the structure of the charging roller 51 according to the present embodiment is not limited to the example in FIG. 1. For example, the charging roller 51 according to the present embodiment may have a laminated structure obtained by laminating a plurality of elastic body layers. Alternatively, the charging roller 51 according to the present embodiment may have a crown shape in which the outer diameter decreases from a center portion toward both end portions. Note that when the charging roller 51 has a crown shape, it is preferable athat a crown amount expressed by D3-D1 and a crown amount expressed by D3-D2 are respectively not less than 50 μm but not more than 150 μm, where D1 and D2 are respectively the outer diameters at both ends of the charging roller 51 and D3 is the outer diameter at the center portion of the charging roller 51. The following describes the structure of the charging roller 51 according to the present embodiment in more detail.

[Conductive Shaft]

The conductive shaft 51*a* is a cylindrical member made of a conductive metal. The conductive shaft 51*a* is used as a core metal. It is preferable that a material of the conductive shaft 51*a* is aluminum. A diameter of the conductive shaft 51*a* is, for example, not less than 3 mm and not more than 10 mm. A load is applied to each of both ends of the conductive shaft 51*a*, and it is desirable that a load of not less than 200 g but not more than 800 g is applied to each of both ends of the conductive shaft 51*a*.

[Elastic Body Layer]

The elastic body layer 51*b* is a layer having elasticity. The elastic body layer 51*b* has a thickness of, for example, not less than 1.0 mm but not more than 5.0 mm. The elastic body layer 51*b* contains, for example, rubber (specifically, vulcanized rubber) as a main component. A percentage content of the rubber in the elastic body layer 51*b* is preferably not less than 50.0% by mass but not more than 80.0% by mass, and more preferably not less than 55.0% by mass but not more than 65.0% by mass.

Examples of the rubber contained in the elastic body layer 51*b* include a polyurethane-based elastomer, hydrin rubber (specifically, epichlorhydrin rubber), styrene-butadiene rubber (SBR), polynorbornene rubber, ethylene-propylene-diene rubber (EPDM), acrylonitrile-butadiene rubber (NBR), hydrogenated acrylonitrile-butadiene rubber (H-NBR), butadiene rubber (BR), isoprene rubber (IR), natural rubber (NR), and silicone rubber. The rubber contained in the elastic body layer 51*b* is preferably the hydrin rubber.

The elastic body layer 51*b* preferably further contains at least one type of a filler, an electronic conductive agent, and an ionic conductive agent. The elastic body layer 51*b* may further contain oil.

Examples of the filler include calcium carbonate and clay. A percentage content of the filler in the elastic body layer 51*b* is preferably not less than 20.0 parts by mass but not more than 80.0 parts by mass with respect to 100.0 parts by mass of rubber.

Examples of the electronic conductive agent include carbon black particles, graphite particles, potassium titanate particles, iron oxide particles, titanium oxide particles, zinc oxide particles, tin oxide particles. The electronic conductive agent is preferably the carbon black particle. A percentage content of the electronic conductive agent in the elastic body layer 51*b* is preferably not less than 5.0 parts by mass but not more than 40.0 parts by mass with respect to 100.0 parts by mass of rubber.

Examples of the ionic conductive agent include organic salts (e.g., sodium trifluoroacetate), inorganic salts (e.g., quaternary ammonium salts), metal complexes, ionic liquids. The ionic conductive agent is preferably the sodium trifluoroacetate. A percentage content of the ionic conductive agent in the elastic body layer 51*b* is preferably not less than 0.1 parts by mass but not more than 2.0 parts by mass with respect to 100.0 parts by mass of rubber.

[Surface Layer]

The surface layer 51*c* is an outermost layer of the charging roller 51. The surface layer 51*c* preferably has a thickness of not less than 3 μm but not more than 80 μm, and more preferably not less than 10 μm but not more than 20 μm. The surface layer 51*c* contains at least a binder resin 101 and conductive particles 102 as a conducting agent. By adding the conducting agent to the surface layer 51*c*, the electrical resistance of the surface layer 51*c* can be adjusted to a desired value. Note that the surface layer 51*c* preferably further contains resin particles 103.

(Binder Resin)

A thermoplastic resin is used for the binder resin 101. As described above, the binder resin 101 according to the present embodiment contains only the thermoplastic resin. Examples of the binder resin 101 include a (meth)acrylic resin, a polyamide resin (specifically, a polyamide resin containing an aliphatic skeleton (so-called nylon (registered trademark)), a urethane resin, a(meth)acrylic fluorine contained resin, and a (meth)acrylic silicone resin, each of which has thermoplasticity. The binder resin 101 is preferably the thermoplastic polyamide resin (in particular, thermoplastic polyamide resin containing the aliphatic skeleton). Examples of such a polyamide resin include quaternary copolymer polyamide resins of polyamide 6 (nylon 6), polyamide 12 (nylon 12), polyamide 66 (nylon 66), and polyamide 610 (nylon 610).

In the present embodiment, a thermoplastic resin having a water contact angle of not less than 40° but less than 180° (specifically, not more than 20840/127° (≈164°), as described above) is used for the binder resin 101. As described above, the thermoplastic resins having the water contact angle of not less than 40° but less than 180° have a low water absorption rate and can suppress electrical conduction (ionic conduction by the binder resin 101) in portions other than the conductive particles 102 that occurs when the binder resin 101 absorbs water. Moreover, since the thermoplastic resin having a water contact angle of not less than 40° but less than 180° dissolves in alcohol, such as methanol, it is possible to form the surface layer 51*c* by applying a solution. Therefore, as described above, the thermoplastic resin having a water contact angle of not less than 40° but not more than 20840/127° has a low water absorption rate, and can suppress conductivity in portions other than the conductive particles 102 that occurs when the binder resin 101 absorbs water, and can form a surface layer 51*c* by applying the solution. The water contact angle of the thermoplastic resin used as the binder resin 101 is preferably not less than 40° but less than 140°, more preferably not less than 60° but less than 130°, and even more preferably not less than 80° but less than 120°.

Surface free energy of the thermoplastic resin is preferably not less than 20 $\mu J/m^2$ but not more than 65 $\mu J/m^2$, more preferably not less than 20 $\mu J/m^2$ but not more than 45 $\mu J/m^2$, and even more preferably not less than 20 $\mu J/m^2$ but not more than 40 $\mu J/m^2$. The surface free energy of the thermoplastic resin can be measured by a contact angle meter (e.g., "DMs-401" made by Kyowa Interface Science Co., Ltd.).

A percentage content of the binder resin 101 in the surface layer 51*c* is preferably not less than 25.0% by mass but not more than 60.0% by mass, and more preferably not less than 35.0% by mass but not more than 45.0% by mass. By setting the percentage content of the binder resin 101 in the surface layer 51*c* to not less than 25.0% by mass, it is possible to ensure sufficient strength of the surface layer 51*c*. By setting the percentage content of the binder resin 101 in the surface layer 51*c* to not more than 60.0% by mass it becomes easier to ensure the amounts of the conductive particles 102 and the resin particles 103 in the surface layer 51*c*.

(Conductive Particles)

The conductive particles 102 impart appropriate electrical conductivity to the surface layer 51*c*. As the conductive particles 102, as described above, a plurality of types of conductive particles are used. The conductive particles 102 contain at least two kinds of conductive particles containing at least second conductive particles 102*b* and first conductive particles 102*a* different from the second conductive particles 102*b*.

The total content of the conductive particles 102 in the surface layer 51*c* (hereinafter, may be simply referred to as the content of the conductive particles 102) is preferably not less than 15.3 parts by mass but not more than 230.0 parts by mass, more preferably not less than 50.0 parts by mass but not more than 200.0 parts by mass, and even more preferably not less than 80.0 parts by mass but not more than 150.0 parts by mass with respect to 100.0 parts by mass of the binder resin. By setting the content of the conductive particles 102 in the surface layer 51*c* to not less than 15.3 parts by mass with respect to 100.0 parts by mass of the binder resin, it is possible to impart favorable conductivity to the surface layer 51*c* and sufficiently reduce the resistance of the surface layer 51*c*. Moreover, by setting the content of the conductive particles 102 in the surface layer 51*c* to not more than 230.0 parts by mass with respect to 100.0 parts by mass of the binder resin, it is possible to suppress uneven discharge due to charge concentration in the surface layer 51*c*, and it becomes easier to ensure the amount of resin particles 103 in the surface layer 51*c*.

(First Conductive Particles)

The first conductive particles 102*a* are carbon black particles. The carbon black particles have electrical conductivity between ionic conductivity and electronic conductivity, and are particularly suitable for mediating an exchange of electric charges between the binder resin and the second conductive particles 102*b*. An example of the carbon black particles is furnace black. The grade of the carbon black particles is not particularly limited, but is preferably a grade that has good extrudability.

In the charging roller 51 according to the present embodiment, the water contact angle of the thermoplastic resin and the content of the first conductive particles 102*a* in the conductive particles 102 satisfy the above-described expressions (1) to (3).

Consequently, it is possible to appropriately reduce the resistance of the surface layer 51*c* and to improve the electrical response. Thus, the electric charge required for charging the surface of the photosensitive member can be sufficiently supplied (transported) to the photosensitive member. Moreover, the lower the resistance, the more likely there is to be the uneven discharge. This is because when the resistance is too low, a leakage current is likely to occur. However, as described above, the resistance of the surface layer 51*c* can be appropriately reduced, thereby sufficiently suppressing the occurrence of uneven discharge, when the water contact angle of the thermoplastic resin and the content of the first conductive particles 102*a* in the conductive particles 102 satisfy the above-described expressions (1) to (3).

As illustrated in FIG. 4 below, the value x (the content of the first conductive particles 102*a* in the conductive particles 102; referred to as the "conductive agent mass ratio" in FIG. 4) is within a range of not less than 0.3% by mass but not more than 20.0% by mass, also depending on the value y (water contact angle of the thermoplastic resin), as expressed in the above-described expressions (2) and (3). In FIG. 4, the horizontal axis indicates the value x, and the vertical axis indicates the value y. The value x is preferably not less than 2.0% by mass but not more than 15.0% by mass, and more preferably not less than 2.0% by mass but not more than 10.0% by mass. By setting the value x to be not less than 0.3% by mass but not more than 20.0% by mass, it becomes easy to adjust the values x and y so as to satisfy the above-described expressions (1) to (3). Moreover, the favorable electrical conductivity can be imparted to the surface layer 51*c*, and the resistance of the surface layer 51*c* can sufficiently be reduced. Thus, the electric charge required for charging the surface of the photosensitive member can be sufficiently supplied (transported) to the photosensitive member. Moreover, it becomes easier to ensure the amounts of the second conductive particles 102*b* in the surface layer 51*c*.

The content of the first conductive particles 102*a* in the surface layer 51*c* is preferably not less than 0.3 parts by mass but not more than 30.0 parts by mass, and more preferably not less than 2.0 parts by mass but not more than 10.0 parts by mass, and even more preferably not less than 2.0 parts by mass but not more than 8.0 parts by mass, with respect to 100.0 parts by mass of the binder resin. By setting the content of the first conductive particles 102*a* in the surface layer 51*c* to not less than 0.3 parts by mass but not more than 30.0 parts by mass with respect to 100.0 parts by mass of the binder resin, it is possible to charge the surface of the image bearing member more uniformly, thereby further suppressing uneven discharge.

Moreover, the number average primary particle diameter of the first conductive particles 102*a* is preferably not less than 10 nm but not more than 200 nm, more preferably not less than 20 nm but not more than 100 nm, and even more preferably not less than 30 nm but not more than 60 nm. By setting the number average primary particle diameter of the first conductive particles 102*a* to not less than 10 nm but not more than 200 nm, it is possible to impart favorable electrical conductivity to the surface layer 51*c* and to charge the surface of the image bearing member more uniformly, thereby further suppressing uneven discharge.

The BET specific surface area of the first conductive particles 102*a* is preferably not less than 20 $m^2/g$ but not more than 150 $m^2/g$, and more preferably not less than 35 $m^2/g$ but not more than 135 $m^2/g$. Such carbon black particles having the relatively small BET specific surface area are used for the first conductive particles 102*a*, thereby providing the charging roller 51 capable of sufficiently suppressing the occurrence of uneven discharge and having a low rotational resistance.

The BET specific surface area of the first conductive particles 102*a* is measured by the BET method using nitrogen adsorption in accordance with "Japanese Industrial Standards, JIS Z 8830: 2001, method for measuring specific surface area of fine (solid) particles by gas adsorption". For the measurement, for example, a fully-automatic BET specific surface area measuring device ("Macsorb (registered trademark) HM MODEL-1208", product of Mountec Co., Ltd.) can be used.

(Second Conductive Particles)

The second conductive particles 102*b* are a different type of conductive particles from the first conductive particles 102*a*. The second conductive particles 102*b* are preferably metal oxide particles. Examples of the metal oxide particles include potassium titanate particles, iron oxide particles, titanium oxide particles, aluminium oxide particles, zinc oxide particles, and tin oxide particles. Some metal oxide particles exhibit sufficient electrical conductivity on their own, but others do not. In order to make the material sufficiently conductive, dopants may be added to these compounds. For example, antimony, phosphorus, indium, etc. are used as dopants for the tin oxide. Therefore, the metal oxide particles may be metal oxide particles to which a dopant is added, such as phosphorus-doped tin oxide particles, antimony-doped tin oxide particles, or indium-doped tin oxide particles. Among these metal oxide particles, the phosphorus-doped tin oxide particles are more preferred.

The number average primary particle diameter of the second conductive particles 102*b* is preferably not less than 10 nm but not more than 200 nm, and more preferably not less than 10 nm but not more than 40 nm. By setting the number average primary particle diameter of the second conductive particles 102*b* to not less than 10 nm but not more than 200 nm, favorable conductivity can be imparted to the surface layer 51*c*.

The content of the second conductive particles 102*b* in the surface layer 51*c* is preferably not less than 10.0% by mass but not more than 55.0% by mass. This makes it possible to appropriately reduce the resistance of the surface layer 51*c*, to improve the electrical response, and to sufficiently suppress the occurrence of uneven discharge. Moreover, the content of the second conductive particles 102*b* in the surface layer 51*c* is more preferably not less than 10.0% by mass but not more than 45.0% by mass, and still more preferably not less than 10.0% by mass but not more than 35.0% by mass. Thus, it is possible to further improve the effect of suppressing the occurrence of uneven discharge, and it becomes easier to ensure the amounts of first conductive particles 102*a* and resin particles 103 in the surface layer 51*c*.

The content of the second conductive particles 102*b* in the surface layer 51*c* is preferably not less than 15.0 parts by mass but not more than 200.0 parts by mass, and more preferably not less than 20.0 parts by mass but not more than 150.0 parts by mass, with respect to 100.0 parts by mass of the binder resin. This makes it possible to appropriately reduce the resistance of the surface layer 51*c*, to improve the electrical response, and to sufficiently improve the effect of suppressing the occurrence of uneven discharge. Moreover, it becomes easier to ensure the amounts of the first conductive particles 102*a* and the resin particles 103 in the surface layer 51*c*.

The content of the second conductive particles 102*b* in the conductive particles 102 is preferably not less than 80.0% by mass but not more than 99.7% by mass, more preferably not less than 85.0% by mass but not more than 98.0% by mass, and even more preferably not less than 90.0% by mass a but not more than 98.0% by mass. By setting the content of the second conductive particles 102*b* in the conductive particles 102 to not less than 80.0% by mass but not more than 99.7% by mass, it is possible to impart favorable conductivity to the surface layer 51*c* and sufficiently reduce the resistance of the surface layer 51*c*. Moreover, by setting the content of the second conductive particles 102*b* in the conductive particles 102 to not less than 80.0% by mass but not more than 99.7% by mass, it becomes easier to ensure the amount of the first conductive particles 102*a* in the surface layer 51*c*.

In the present embodiment, the first conductive particles 102*a* and the second conductive particles 102*b* are disintegrated and dispersed so that the particle size distribution of the conductive particles 102 has a peak within the range of not less than 0.01 μm but not more than 1.00 μm. As described above, when the particle size distribution of the conductive particles 102 has a peak within the range of not less than 0.01 μm but not more than 1.00 μm, the conductive particles 102 are in a state of being sufficiently dispersed, and uneven discharge can be effectively suppressed.

As described above, when the first conductive particles 102*a* and the second conductive particles 102*b* are both ideally dispersed, the particle size distribution of the conductive particles 102 has two peaks within the range of not less than 0.01 μm but not more than 1.00 μm. Therefore, it is particularly desirable that the particle size distribution of the conductive particles 102 has two peaks within the range of not less than 0.01 μm but not more than 1.00 μm. However, it can be considered that when the particle size distribution of the conductive particles 102 has at least one peak within the range of not less than 0.01 μm but not more than 1.00 μm, the conductive particles 102 are sufficiently disintegrated and are sufficiently uniformly dispersed in the surface layer 51*c*. Therefore, it is sufficient that the particle size distribution of the conductive particles 102 has at least one peak within the range of not less than 0.01 μm but not more than 1.00 μm, but it is more preferable that the metal oxide particles, which are the second conductive particles 102*b*, have a peak within the range of not less than 0.01 μm but not more than 1.00 μm.

Note that the particle size distribution of the conductive particles 102 having the peak within the range of not less than 0.01 μm but not more than 1.00 μm means that the particle size distribution has a peak top within the range of not less than 0.01 μm but not more than 1.00 μm. The term "peak" used herein means a point that provides a maximal value (locally viewed maximum value) when viewing the particle size distribution curve.

Due to cost and the like, it is difficult and unrealistic to disintegrate and disperse all of the conductive particles 102 so that their particle size falls within the range of not less than 0.01 μm but not more than 1.00 μm. Conductive particles 102 which are not sufficiently disintegrated appear as a large peak (e.g., a maximum peak) at a position where the particle diameter of the particle size distribution is relatively large. According to investigation of the present inventors, it can be considered that when a size (frequency value) of the maximum peak with respect to a size (frequency value) of the minimum peak in the particle size distribution of the conductive particles 102 is not more than 5 times, the conductive particles 102 are sufficiently disintegrated.

(Resin Particles)

The resin particles 103 impart an appropriate surface roughness to the surface layer 51*c*. Examples of the resin particles 103 include (meth)acrylic resin particles, urethane resin particles, silicone resin particles, polyester resin particles, polystyrene resin particles, styrene-(meth)acrylic resin particles, and polyolefin resin particles. The resin particles 103 may be cross-linkable resin particles. The resin particles 103 are preferably acrylic resin particles, and more preferably cross-linkable acrylic resin particles.

The number average primary particle diameter of the resin particles 103 is preferably not less than 1 μm but not more than 50 μm, more preferably not less than 3 μm but not more than 20 μm, and even more preferably not less than 4 μm but not more than 7 μm. By setting the number average primary particle diameter of the resin particles 103 to not less than 1 μm, it is possible to impart an appropriate surface roughness to the surface layer 51*c*. Moreover, by setting the number average primary particle diameter of the resin particles 103 to not more than 50 μm, it is possible to prevent the surface roughness of the surface layer 51*c* from being excessive, and to prevent a contact area with the image bearing member from being too small. As a result, it becomes easy to charge the image bearing member uniformly.

The content of the resin particles 103 in the surface layer 51*c* is preferably not less than 4.0 parts by mass but not more than 120.0 parts by mass, and more preferably not less than 30.0 parts by mass but not more than 90.0 parts by mass, and even more preferably not less than 40.0 parts by mass but not more than 60.0 parts by mass, with respect to 100.0 parts by mass of the binder resin. By setting the content of the resin particles 103 in the surface layer 51*c* to not less than 4.0 parts by mass but not more than 120.0 parts by mass with respect to 100.0 parts by mass of the binder resin, it is possible to optimize the surface roughness of the surface layer 51*c*.

The surface layer 51*c* preferably has a surface roughness in terms of ten-point average roughness (Rz) of not less than 4.0 μm but not more than 30.0 μm. By setting the ten-point average roughness (Rz) of the surface layer 51*c* to not less than 4.0 μm, it is possible to appropriately reduce the contact area between the charging roller 51 and the image bearing member, so that a toner component adhering to the image bearing member is less likely to migrate to a surface of the charging roller 51. Moreover, by setting the ten-point average roughness (Rz) of the surface layer 51*c* to not more than 30.0 μm, the charging roller 51 can easily charge the surface of the image bearing member uniformly. Note that the ten-point average roughness (Rz) indicates a value measured in accordance with Japanese Industrial Standards, JIS B 0601:1994.

The ten-point average roughness (Rz) of the surface layer 51*c* in the charging roller 51 can be adjusted with a primary particle diameter and the content of the resin particles 103 contained in the surface layer 51*c*. Specifically, ten-point average roughness (Rz) of a surface layer 51*c* can be increased by increasing the primary particle diameter of the resin particles 103 or increasing the content of the resin particles 103.

The total content of the conductive particles 102 and the resin particles 103 in the surface layer 51*c* is preferably not less than 19.3 parts by mass but not more than 340.0 parts by mass, and more preferably not less than 70.0 parts by mass but not more than 240.0 parts by mass, with respect to 100.0 parts by mass of the binder resin.

The charging roller 51 according to the present embodiment has a low rotational resistance of less than 6.5 log Ω when it is left in a low temperature and low humidity (LL) environment (specifically, e.g., a temperature of 10.0° C. and a humidity of 10% RH) for 24 hours and then rotated at a rotational speed of 100 mm/sec in the LL environment with a charging voltage (direct current voltage) of 500 V applied thereto.

Therefore, the charging roller 51 according to the present embodiment has sufficient electrical conductivity even under the LL environment. Therefore, the charging roller 51 according to the present embodiment has favorable electrical response and has sufficient charge transport capacity even under the LL environment. Moreover, the charging roller 51 according to the present embodiment has low rotational resistance even under the LL environment and does not require a large force to rotate the charging roller 51. Therefore, the charging roller 51 according to the present embodiment can rotate the charging roller 51 smoothly even under the LL environment. Therefore, the charging roller 51 according to the present embodiment has high durability and the surface layer 51*c* is not easily damaged even during long-term use. Thus, the charging roller 51 according to the present embodiment has reduced environmental dependency, and has sufficient strength to prevent damage to the charging roller 51 even though the thermoplastic resin is used as the binder resin.

[Manufacturing Method of Charging Roller]

The following describes an example of a manufacturing method of the charging roller according to the present embodiment. The manufacturing method of the charging roller according to the present embodiment includes, for example, an elastic body layer formation step and a surface layer formation step.

[Elastic Body Layer Formation Step]

In the elastic body layer formation step, the elastic body layer 51*b* is formed on the outer peripheral surface of the conductive shaft 51*a*. As a result, a member (hereinafter sometimes referred to as a first member) is obtained including the conductive shaft 51*a* and the elastic body layer 51*b* covering the outer peripheral surface of the conductive shaft 51*a*.

A method for forming the elastic body layer 51*b* on the outer periphery of the conductive shaft 51*a* includes, for example, a method of laminating an elastic body layer forming composition on the outer periphery of the conductive shaft 51*a* using a molding die or the like, and then heating the elastic body layer forming composition The elastic body layer forming composition contains, for example, unvulcanized rubber (unvulcanized product of the above-described rubber) and sulfur.

The elastic body layer forming composition preferably further contains at least one of a filler, an electronic conductive agent, and an ionic conductive agent. The elastic body layer forming composition may further contain oil. The filler, the electronic conductive agent, the ionic conductive agent, and the oil impart desired properties to the elastic body layer 51*b* to be formed. The elastic body layer forming composition preferably further contains at least one of a vulcanizing agent, a vulcanization accelerator, and a vulcanization aid in order to accelerate the vulcanization of the unvulcanized rubber. The elastic body layer forming composition may further contain a foaming agent for forming a foam structure.

In the elastic body layer forming composition, the content of the sulfur is preferably not less than 0.2 parts by mass but not more than 3.0 parts by mass with respect to 100.0 parts by mass of the unvulcanized rubber. In the elastic body layer forming composition, the content of the vulcanization accelerator is preferably not less than 0.4 parts by mass but not more than 4.0 parts by mass with respect to 100.0 parts by mass of the unvulcanized rubber. In the elastic body layer forming composition, the content of the vulcanization aid is preferably not less than 2.0 parts by mass but not more than 10.0 parts by mass with respect to 100.0 parts by mass of the unvulcanized rubber.

In the elastic body layer formation step, the heating temperature when the elastic body layer forming composition is heated is preferably not less than 120° C. but not more than 200° C. In the elastic body layer formation step, the heating time for heating the elastic body layer forming composition is preferably not less than 5 minutes but not more than 60 minutes.

[Surface Layer Formation Step]

In the surface layer formation step, a surface layer forming solution is applied to the outer periphery of the elastic body layer 51*b* of the first member, thereby forming the surface layer 51*c* on the outer periphery of the elastic body layer 51*b* of the first member. The surface layer forming solution contains, for example, the binder resin 101, the first conductive particles 102*a*, the second conductive particles 102*b*, the resin particles 103, and the solvent. In particle size distribution measurement, the particle size distribution of the surface layer forming solution shows, for example, at least one peak (a peak derived from the conductive particles 102) located within a range of the particle diameter of not less than 0.01 μm but not more than 1 μm and at least one peak (a peak derived from the resin particles 103) located within a range of the particle diameter of not less than 1 μm but not more than 50 μm. The peak derived from the conductive particles 102 located within the range of the particle diameter of not less than 0.01 μm but not more than 1 μm preferably includes a peak derived from the second conductive particles 102*b*, and more preferably includes two peaks, the peak derived from the second conductive particles 102*b* and a peak derived from the first conductive particles 102*a*.

In this way, by forming the surface layer 51*c* using the surface layer forming solution showing the particle size distribution having the peak derived from the conductive particles 102 located within the range of the particle diameter of not less than 0.01 μm but not more than 1 μm and a peak derived from the resin particles 103 located within the range of the particle diameter of not less than 1 μm but not more than 50 μm, it is possible to form the surface layer 51*c* showing the particle size distribution having a peak derived from the conductive particles 102 located within the range of the particle diameter of not less than 0.01 μm but not more than 1 μm and a peak derived from the resin particles 103 located within the range of the particle diameter of not less than 1 μm but not more than 50 μm. Therefore, it can be considered that when the particle size distribution of the conductive particles 102 in the surface layer forming solution has the peak within the range of not less than 0.01 μm but not more than 1.00 μm, the particle size distribution of the conductive particles 102 in the surface layer 51*c* has the peak within the range of not less than 0.01 μm but not more than 1.00 μm.

The solvent for the surface layer forming solution is not particularly limited as long as it is a solvent capable of dissolving or dispersing the binder resin 101, the first conductive particles 102*a*, the second conductive particles 102*b*, and the resin particles 103. Examples of the solvent include alcohol solvents (e.g., methanol, ethanol, propanol, and the like) and aromatic compound solvents (e.g., benzene, toluene, xylene, and the like). The solvent is preferably a mixed solvent of methanol and toluene.

The surface layer forming solution can be prepared by performing a dispersion process of the binder resin 101, the first conductive particles 102*a*, the second conductive particles 102*b*, the resin particles 103, and the solvent using a wet disperser (e.g., a ball mill).

Examples of the method of applying the surface layer forming solution include a dip coating method and a blade coating method. After applying the surface layer forming solution to the elastic body layer 51*b*, it is preferable to heat and dry the surface layer forming solution. The heating temperature when heating the surface layer forming solution in the surface layer formation step is, for example, not less than 90° C. but not more than 150° C. The heating time when heating the surface layer forming solution in the surface layer formation step is, for example, not less than 20 minutes but not more than 120 minutes.

Second Embodiment: Image Forming Apparatus

The following describes an image forming apparatus according to a second embodiment disclosed herein. The image forming apparatus according to the present embodiment includes an image bearing member, a charging device configured to charge a surface of the image bearing member, an exposure device configured to expose the charged surface of the image bearing member and to form an electrostatic latent image on the surface of the image bearing member, a development device configured to develop the electrostatic latent image as a toner image, and a transfer device configured to transfer the toner image from the image bearing member to a transfer target. The charging device is the charging roller according to the first embodiment.

The image forming apparatus according to the present embodiment includes the charging roller according to the first embodiment, and therefore can sufficiently suppress the occurrence of uneven discharge. Moreover, the image forming apparatus according to the present embodiment includes the charging roller according to the first embodiment, and therefore the rotational resistance of the charging roller is low.

Figure 2:
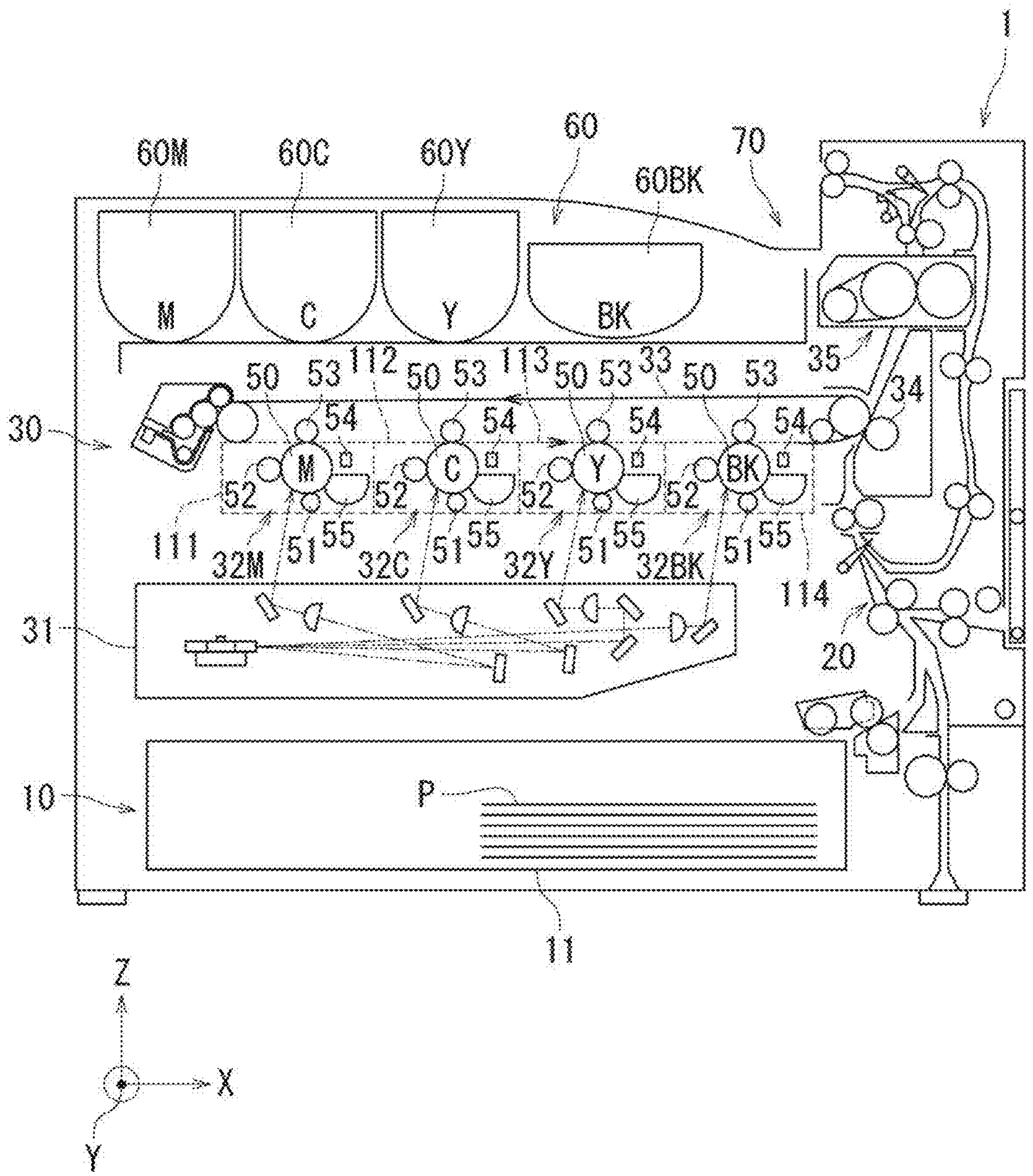
FIG. 2 is a cross-sectional diagram illustrating an example of an image forming apparatus according to a second embodiment disclosed herein.
Figure 3:
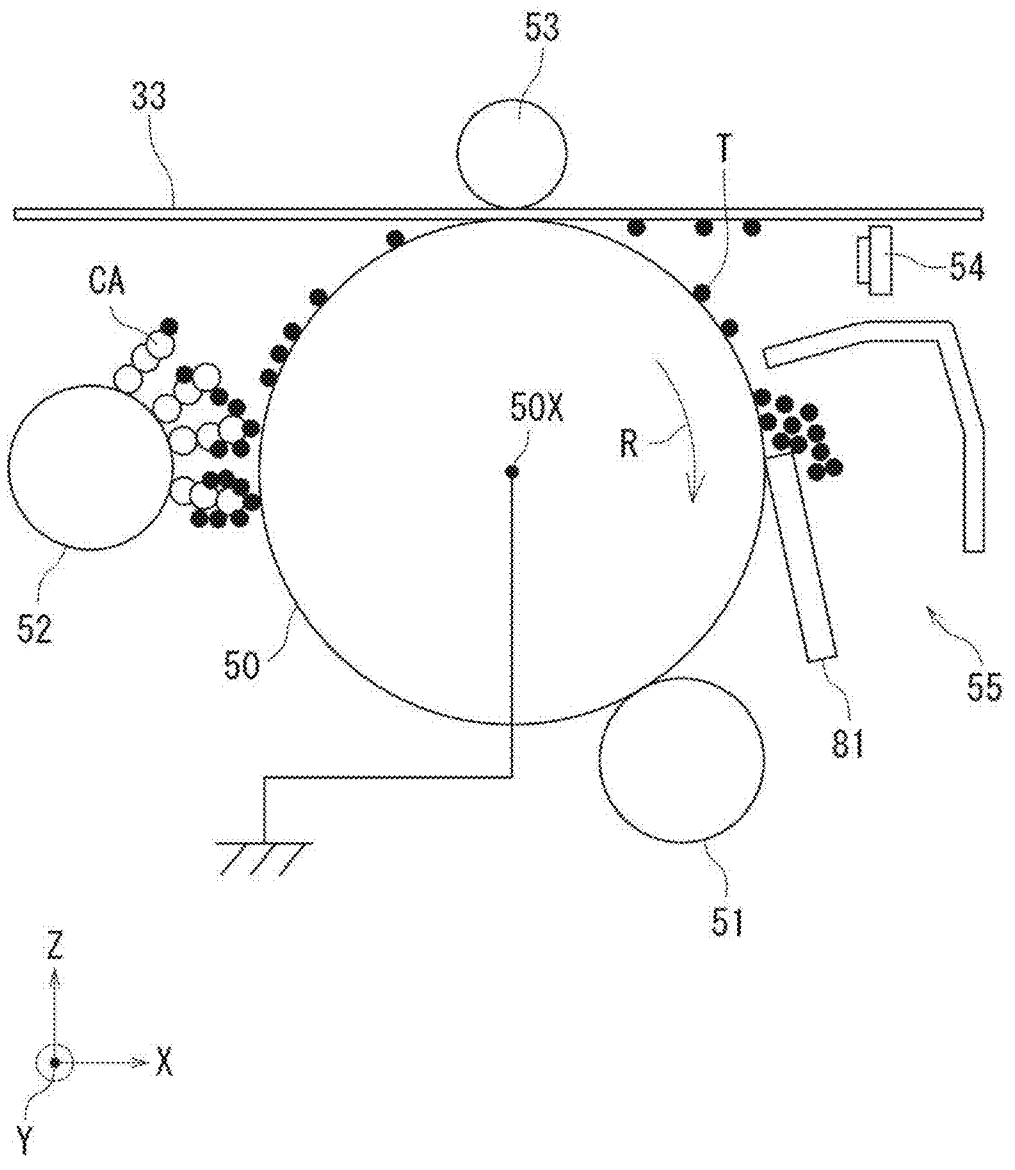
FIG. 3 is a cross-sectional diagram schematically illustrating a photosensitive member and its peripheral portion that are provided in the image forming apparatus illustrated in FIG. 2.

The following describes an example of the image forming apparatus according to the present embodiment with reference to FIGS. 2 and 3. FIG. 2 is a cross-sectional diagram illustrating an image forming apparatus 1, which is an example of the image forming apparatus according to the present embodiment. FIG. 3 is a cross-sectional diagram schematically illustrating a photosensitive member 50 and its peripheral portion that are provided in the image forming apparatus 1 illustrated in FIG. 2. Note that components having the same functions are given the same reference signs and the descriptions thereof will not be repeated. In the present embodiment, the X-axis, the Y-axis, and Z-axis are orthogonal to one another, the X-axis and Y-axis are parallel to a horizontal plane, and the Z-axis is parallel to a vertical line.

The image forming apparatus 1 is a full color printer using a two-component developer. As illustrated in FIG. 2, the image forming apparatus 1 includes a feed section 10, a conveyance section 20, image forming section 30, a toner supplying section 60, and an ejection section 70.

The feed section 10 includes a cassette 11 that accommodates a plurality of sheets P. The feed section 10 feeds the sheet P from the cassette 11 to the conveyance section 20. The sheet P is made of paper or synthetic resin, for example. The conveyance section 20 conveys the sheet P to the image forming section 30.

The image forming section 30 includes an exposure device 31, a magenta unit (hereinafter referred to as the M unit) 32M, a cyan unit (hereinafter referred to as the C unit) 32C, a yellow unit (hereinafter referred to as the Y unit) 32Y, a black unit (hereinafter referred to as the BK unit) 32BK, a transfer belt 33, a secondary transfer roller 34, and a fixing device 35. Each of the M unit 32M, the C unit 32C, the Y unit 32Y, and the BK unit 32BK includes a photosensitive member 50 (corresponding to the image bearing member), a charging roller 51 (corresponding to the charging device), a development roller 52 (corresponding to the development device), a primary transfer roller 53 (corresponding to the transfer device), a static elimination lamp 54, and a cleaner 55. Each of the M unit 32M, the C unit 32C, the Y unit 32Y, and the BK unit 32BK may be formed as a cartridge.

The exposure device 31 irradiates each of the M unit 32M to the BK unit 32BK with light based on image data and forms an electrostatic latent image on the photosensitive member 50 of each of the M unit 32M to the BK unit 32BK. The M unit 32M forms a magenta toner image on the photosensitive member 50 on the basis of the electrostatic latent image. The C unit 32C forms a cyan toner image on the photosensitive member 50 on the basis of the electrostatic latent image. The Y unit 32Y forms a yellow toner image on the photosensitive member 50 on the basis of the electrostatic latent image. The BK unit 32BK forms a black toner image on the photosensitive member 50 on the basis of the electrostatic latent image.

The toner supplying section 60 includes a cartridge 60M that accommodates magenta toner T as a toner T (refer to FIG. 3), a cartridge 60C that accommodates cyan toner T, a cartridge 60Y that accommodates yellow toner T, and a cartridge 60BK that accommodates black toner T. Each of the cartridge 60M, the cartridge 60C, the cartridge 60Y, and the cartridge 60BK supplies the toner T to the development roller 52 of each of the M unit 32M, the C unit 32C, the Y unit 32Y, and the BK unit 32BK.

As illustrated in FIG. 3, the image forming apparatus 1 includes, in the peripheral portion of the photosensitive member 50, the charging roller 51, the development roller 52, the primary transfer roller 53, the static elimination lamp 54, and the cleaner 55, in this order from an upstream side to a downstream side in the rotation direction R of the photosensitive member 50 (in other words, in the order of the image formation flow). The cleaner 55 includes a cleaning blade 81. The photosensitive member 50 is drum-shaped. The photosensitive member 50 may be any one of a positively chargeable photosensitive member and a negatively chargeable photosensitive member. Alternatively, the photosensitive members 50 may be any one of a single-layer photosensitive member and a multi-layer photosensitive member. The photosensitive member 50 is preferably the positively chargeable single-layer photosensitive member.

The photosensitive member 50 rotates around a rotation axis 50X. In a charging step described below, the charging roller 51 charges (e.g., positively charges) a surface (peripheral surface) of the photosensitive member 50.

In an electrostatic latent image formation step described below, the exposure device 31 illustrated in FIG. 2 exposes the surface (peripheral surface) of the charged photosensitive member 50, thereby forming an electrostatic latent image on the surface (peripheral surface) of the photosensitive member 50.

As illustrated in FIG. 3, the development roller 52 magnetically attracts and bears carriers CA bearing the toner T. When a development bias (development voltage) is applied to the development roller 52, a potential difference is caused between a potential of the development roller 52 and a potential of the peripheral surface of the photosensitive member 50, and the toner T moves and adheres to the electrostatic latent image formed on the peripheral surface of the photosensitive member 50. Thus, in a development step described below, the development roller 52 supplies the toner T to the electrostatic latent image, thereby developing the electrostatic latent image as a toner image. As a result, the toner image is formed on the peripheral surface of the photosensitive member 50. The toner image contains the toner T.

The transfer belt 33 abuts the peripheral surface of the photosensitive member 50. In a primary transfer step described below, the primary transfer roller 53 primarily transfers the toner image formed on the peripheral surface of the photosensitive member 50 onto the transfer belt 33 (more specifically, the outer surface of the transfer belt 33). Four color toner images are primarily transferred so as to be superimposed onto the outer surface of the transfer belt 33. The four color toner images are the magenta toner image, the cyan toner image, the yellow toner image, and the black toner image. A color toner image is formed on the outer surface of the transfer belt 33 through the primary transfer.

In a secondary transfer step described below, the secondary transfer roller 34 illustrated in FIG. 2 secondarily transfers the color toner image formed on the outer surface of the transfer belt 33 onto the sheet P. In a fixing step described below, the fixing device 35 heats and pressurizes the sheet P, thereby fixing the color toner image to the sheet P. The sheet P to which the color toner image is fixed is ejected to the ejection section 70. After the primary transfer, the static elimination lamp 54 included in each of the M unit 32M to the BK unit 32BK eliminates static electricity from the peripheral surface of the photosensitive member 50. Moreover, after the primary transfer (more specifically, after the primary transfer and after the static elimination), the cleaner 55 collects the toner T remaining on the peripheral surface of the photosensitive member 50.

[Charging Roller]

The charging roller 51 is the charging roller according to the first embodiment. The charging roller 51 is disposed so as to be in contact with or close to the peripheral surface of the photosensitive member 50. A direct electrical discharge method or a proximity electric discharge method is adopted for the image forming apparatus 1. A distance between the charging roller 51 and the peripheral surface of the photosensitive member 50 is preferably not more than 50 μm and more preferably not more than 30 μm.

A charging voltage (charging bias) applied to the charging roller 51 is preferably a direct current voltage. When the charging voltage is the direct current voltage, the amount of discharge from the charging roller 51 to the photosensitive member 50 can be smaller than when the charging voltage is a superimposed voltage, thereby reducing an abrasion loss of the photosensitive layer of the photosensitive member 50.

The image forming apparatus according to the present embodiment 1 has been described above with reference to FIGS. 2 and 3. However, the image forming apparatus disclosed herein is not limited to the configuration illustrated in FIGS. 2 and 3, and can be modified as appropriate within the scope of the present disclosure. For example, as long as the image forming apparatus disclosed herein includes the image bearing member, the charging device, the exposure device, the development device, and the transfer device, other members (e.g., the static elimination device and the cleaning device) may be omitted.

Moreover, in the present embodiment, the image forming apparatus 1 has been described as an example of an image forming apparatus using the two-component developer containing the carriers CA and the toner T, but the image forming apparatus 1 disclosed herein may also be an image forming apparatus using a one-component developer. Moreover, in the present embodiment, the image forming apparatus 1 has been described as an example of an image forming apparatus that adopts the intermediate transfer method, but the image forming apparatus disclosed herein may also be an image forming apparatus that adopts a direct transfer method. Furthermore, in the present embodiment, the image forming apparatus 1 has been described as the full color printer, but the image forming apparatus disclosed herein may be a monochrome printer or a multifunction printer.

Third Embodiment: Process Cartridge

The following describes a process cartridge according to a third embodiment disclosed herein. The process cartridge according to the present embodiment is detachably attached to an image forming apparatus. The process cartridge according to the present embodiment includes the charging roller according to the first embodiment.

The process cartridge according to the present embodiment is an image formation cartridge to be detachably attached to the image forming apparatus. The process cartridge according to the present embodiment includes the charging roller according to the first embodiment, and therefore can sufficiently suppress the occurrence of uneven discharge. Moreover, the process cartridge according to the present embodiment includes the charging roller according to the first embodiment, and therefore the rotational resistance of the charging roller is low.

The following describes a first process cartridge 111, a second process cartridge 112, a third process cartridge 113, and a fourth process cartridge 114, which are examples of the process cartridge according to the present embodiment, subsequently with reference to FIGS. 2 and 3. The first process cartridge 111, the second process cartridge 112, the third process cartridge 113, and the fourth process cartridge 114 according to the present embodiment respectively correspond to the M unit 32M, the C unit 32C, the Y unit 32Y, and the BK unit 32BK. Each of these first process cartridge 111 to the fourth process cartridge 114 includes a charging roller 51, which is the charging roller according to the first embodiment.

Each of the first process cartridge 111 to the fourth process cartridge 114 may include a photosensitive member 50 in addition to the charging roller 51. Moreover, each of the first process cartridges 111 to the fourth process cartridge 114 may further include at least one selected from the group consisting of the exposure device 31, the development roller 52 (development device), the primary transfer roller 53 (transfer device), the static elimination lamp 54 (static elimination device), and the cleaner 55 (cleaning device), in addition to the charging roller 51 and the photosensitive member 50.

Each of the first process cartridge 111 to the fourth process cartridge 114 is designed detachably to the image forming apparatus 1. Therefore, each of the first process cartridge 111 to the fourth process cartridge 114 is easy to handle. Specifically, each of the first process cartridge 111 to the fourth process cartridge 114 can be replaced readily and quickly together with the photosensitive member 50 when sensitivity characteristics of the photosensitive member 50 or the like degrade. The process cartridge according to the present embodiment has been described above with reference to FIGS. 2 and 3.

Fourth Embodiment: Image Forming Method

The following describes an image forming method according to a fourth embodiment disclosed herein. The image forming method according to the present embodiment includes a charging step of charging a peripheral surface of an image bearing member by a charging device. The charging device is the charging roller according to the first embodiment. The image forming method according to the present embodiment further includes, for example, an electrostatic latent image formation step, a development step, a primary transfer step, a secondary transfer step, and a fixing step.

The image forming method according to the present embodiment uses the charging roller according to the first embodiment, and therefore can sufficiently suppress the occurrence of uneven discharge. Moreover, the image forming method according to the present embodiment uses the charging roller according to the first embodiment, and therefore the rotational resistance of the charging roller is low.

The following describes the image forming method according to the present embodiment by using an image forming method using the image forming apparatus 1 illustrated in FIGS. 2 and 3 as an example. In the charging step, the peripheral surface of the photosensitive member 50 (image bearing member) is charged (e.g., positively charged) by the charging roller 51 (charging device) according to the first embodiment. In the electrostatic latent image formation step, the exposure device 31 exposes the charged peripheral surface of the photosensitive member 50, thereby forming an electrostatic latent image on the peripheral surface of the photosensitive member 50. In the development step, the development roller 52 supplies toner T to the electrostatic latent image formed on the peripheral surface of the photosensitive member 50, thereby developing the electrostatic latent image as a toner image. As a result, the toner image is formed on the peripheral surface of the photosensitive member 50. In the primary transfer step, the primary transfer roller 53 primarily transfers the toner image formed on the peripheral surface of the photosensitive member 50 onto the transfer belt 33 (more specifically, the outer surface of the transfer belt 33). In the secondary transfer step, the secondary transfer roller 34 secondarily transfers the toner image formed on the outer surface of the transfer belt 33 onto the sheet P. In the fixing step, the fixing device 35 heats and pressurizes the sheet P, thereby fixing the toner image to the sheet P.

The image forming method according to the present embodiment has been described above by using the image forming method using the image forming apparatus 1 illustrated in FIGS. 2 and 3 as an example. However, as long as the image forming method according to the present embodiment includes the charging step of charging the peripheral surface of the image bearing member by the charging device, a different method from the image forming method using the above-described image forming apparatus 1 can be adopted.

EXAMPLES

The following describes the present disclosure further in detail using Examples. However, the present disclosure is not limited in any way to the scope of the Examples.

[Manufacturing of Charging Roller]

Charging rollers of Examples and charging rollers of Comparative Examples were prepared by the following methods.

Example 1

(Formation of Elastic Body Layer)

The following materials were mixed: 100.0 parts by mass of unvulcanized hydrin rubber ("Epichlomer (registered trademark) CG-102", product of Osaka Soda Co., Ltd.); 5.0 parts by mass of zinc oxide ("Zinc Oxide Type 2", product of Mitsui Mining and Smelting Co., Ltd.) as a vulcanization aid; 1.5 parts by mass of 2-mercaptobenzothiazole ("Nocceler (registered trademark) M-P", product of Ouchi Shinko Chemical Industrial Co., Ltd.) as a vulcanization accelerator; 1.0 parts by mass of sulfur ("Sulfax (registered trademark) PS", product of Tsurumi Chemical Industry Co., Ltd.); 50.0 parts by mass of calcium carbonate ("Hakuenka (registered trademark) CC", product of Shiraishi Kogyo Kaisha, Ltd.) as a filler; 20.0 parts by mass of carbon black particles ("Asahi #50", product of Asahi Carbon Co., Ltd.) as an electronic conductive agent; and 0.5 parts by mass of sodium trifluoroacetate as an ionic conductive agent. The obtained mixture was sufficiently stirred with a stirrer. Consequently, an elastic body layer forming composition was prepared.

A conductive shaft (a cylindrical SUM having a diameter of 6 mm) was set to a molding die. Next, the molding die was filled up with the elastic body layer forming composition. Consequently, the elastic body layer forming composition is laminated on the outer periphery of the conductive shaft inside the molding die. Next, the molding die was heated at a temperature of 160° C. for 20 minutes. Consequently, the elastic body layer forming composition in the molding die was vulcanized. Next, the molding die is radiationally cooled to a room temperature, and then the contents of the molding die were demolded. As a result, a first member was obtained including a conductive shaft and an elastic body layer (1.8 mm in thick) laminated on the outer periphery of the conductive shaft.

(Formation of Surface Layer)

A mixed solution was obtained by mixing the following materials: 100.0 parts by mass of polyamide resin ("PA-100A-S", product of T&K TOKA CO., LTD., polymerized fatty acid polyamide resin) as a binder resin; 80.0 parts by mass of phosphorus-doped tin oxide particles ("EP SP-2", product of Mitsubishi Materials Electronic Chemicals Co., Ltd., 10 nm of number average primary particle diameter) as second conductive particles; 2.5 parts by mass of carbon black particles ("SEAST SO", product of Tokai Carbon Co., Ltd., 43 nm of number average primary particle diameter) as first conductive particles; 50.0 parts by mass of acrylic resin particles ("GR-800T", product of Negami Chemical Industrial Co., Ltd., 6 μm of number average primary particle diameter) as resin particles; and 50 parts by mass of methanol, 50 parts by mass of toluene, and 50 parts by mass of butanol as a solvent.

The above-described mixture and zirconia beads were fed in a vessel of ball mill ("Universal Ball Mill Model UB-32", product of Yamato Scientific Co., Ltd.). Next, the contents of the vessel were stirred using the ball mill at a rotational speed of 60 rpm for 24 hours. Next, the contents were extracted from the vessel of the ball mill. Next, the above-described contents were filtered to remove the zirconia beads. Consequently, a surface layer forming solution was obtained.

Next, the surface layer forming solution was applied onto the elastic body layer of the first member described above by using a dip coating method. Next, the applied surface layer forming solution was heated and dried in an electric furnace at 120° C. for 1 hour. Consequently, a charging roller (A-1) of the Example 1 was obtained including the conductive shaft, the elastic body layer laminated on the outer periphery of the conductive shaft, and the surface layer (10 μm in thick) laminated on the outer periphery of the elastic body layer.

Examples 2 to 12, and Comparative Examples 1, 2, 4, 5, and 7

Charge rollers (A-2) to (A-12) according to Examples 2 to 12 and charge rollers (B-1), (B-2), (B-4), (B-5), and (B-7) according to Comparative Examples 1, 2, 4, 5, and 7 were manufactured in the same manner as in Example 1, except that the types and amounts of the binder resin, the first conductive particles, the second conductive particles, and the resin particles used in forming the surface layer were changed as illustrated in Tables 1 to 5 listed below.

Comparative Examples 3 and 6

Charging rollers (B-3) and (B-6) according to Comparative Examples 3 and 6 were manufactured in the same manner as in Example 1, except that the types and amounts of the binder resin, the first conductive particles, the second conductive particles, and the resin particles used in forming the surface layer were changed as illustrated in Table 5 listed below, and the mixing conditions of the mixed solution using a ball mill in forming the surface layer were changed as listed below. The mixing conditions in Comparative Example 3 were changed so that the mixing time in the ball mill was 1 hour. In Comparative Example 6, the mixing conditions were the same, but a binder resin having low hygroscopicity was used.

The binder resins used in the Tables 1 to 5 listed below are as follows:

"PA-100A-S": "PA-100A-S", product of T&K TOKA CO., LTD., thermoplastic polyamide resin;

"CM-8000": "Amilan (registered trademark) CM8000", product of Toray Industries, Inc., quaternary copolymer polyamide resin (thermoplastic polyamide resin) of nylon 6, nylon 12, nylon 66, and nylon 610;

"PA-201": "PA-201", product of T&K TOKA CO., LTD., thermoplastic polyamide resin;

"PA-100": "PA-100", product of T&K TOKA CO., LTD., thermoplastic polyamide resin;

"FR-101": "Fine Resin FR-101", product of Namariichi Co., Ltd., methoxymethylated polyamide resin (thermoplastic polyamide resin); and "FR-104": "FR-104", product of Namariichi Co., Ltd., methoxymethylated polyamide resin (thermoplastic polyamide resin).

First conductive particles used in the following Tables 1 to 5 are as follows:

"SEAST SO": "SEAST SO", product of Tokai Carbon Co., Ltd., carbon black particles, 43 nm of number average primary particle diameter;

"Shoblack N330": "Shoblack N330", product of Cabot Japan K.K., carbon black particles, 30 nm of number average primary particle diameter; and "ASAHI #78": "ASAHI #78", product of Asahi Carbon Co., Ltd., carbon black particles, 22 nm of number average primary particle diameter.

Second conductive particles used in the following Tables 1 to 5 are as follows:

"SP2": "EP SP2", product of Mitsubishi Materials Electronic Chemicals Co., Ltd., phosphorus-doped zinc oxide particles, 10 nm of number average primary particle diameter.

Resin particles used in the following Tables 1 to 5 are as follows:

"MZ-5HN": "MZ-5HN", product of Soken Chemical & Engineering Co., Ltd., acrylic resin particles (main component: cross-linkable acrylic resin), 5 μm of number average primary particle diameter; and "GR-800T": "Art Pearl (registered trademark) GR-800T", product of Negami Chemical Industrial Co., Ltd., cross-linkable acrylic resin particles, 6 μm of number average primary particle diameter.

In the following Tables 1 to 5, [parts] indicates parts by mass. The conductive agent mass ratio [%] of first conductive particles indicates the content (percentage content) (% by mass) of the first conductive particles in the conductive particles. The conductive agent mass ratio [%] of second conductive particles indicates the content (percentage content) (% by mass) of the second conductive particles in the conductive particles. The "included" or "not included" of the peak (0.01 to 1.00 μm) indicates whether or not there is a peak within the range of not less than 0.01 μm but not more than 1.00 μm in the particle size distribution of the conductive particles in the surface layer.

[Measurement]

[Number Average Primary Particle Diameter]

The number average primary particle diameters of the particles were measured using a scanning electron microscope (field emission scanning electron microscope, "JSM-7600F", product of JEOL Ltd.). Specifically, the equivalent diameters (Haywood diameters: the diameters of circles having the same areas as the projected areas of primary particles) of 100 primary particles, which are target particles using the scanning electron microscope, were measured, to obtain the number average value thereof.

[Thickness]

The thicknesses of the elastic body layer and the surface layer were measured by observing the cross section with the above-described scanning electron microscope. Specifically, the thickness was measured at 20 randomly selected points of the target layer (elastic body layer or surface layer) within the field of view of the electron microscope, and the arithmetic mean value was taken as the thickness of the target layer.

[Water Contact Angle]

The water contact angle of thermoplastic resin was measured using a contact angle meter "OCA-40", product of DataPhysics Instruments. In detail, at room temperature (22° C.), pure water was dropped on the surface of a thermoplastic resin layer made of the thermoplastic resin to be measured, and the angle formed by the tangent line of the droplet drawn from the contact point of the three phases, i.e., the solid phase (intermediate transfer body), the liquid phase (droplet), and the gas phase (atmosphere), and the surface of the thermoplastic resin layer on the droplet side was measured, and this value was defined as the water contact angle of the thermoplastic resin.

[Measurement of Particle Size Distribution]

The particle size distribution on a volumetric basis of the prepared surface layer forming solution is measured by a laser diffraction and scattering method using a laser diffraction type particle size distribution analyzer ("SALD-2300", product of Shimadzu Corporation), and it is verified whether or not a peak in frequency (relative particle mass) is included in a range of the particle diameter of not less than 0.01 μm but not more than 1.00 μm. In the particle size distribution measurement, the refractive index was set to 2.00 to 0.10 i, and the absorbance was set to 0.3 to 0.6.

As a result, regarding each of the surface layer forming solutions for preparing the charging rollers (A-1) to (A-12), (B-1), (B-2), (B-4), (B-5), and (B-7), it has been verified that at least one peak derived from the conductive particles is included in the particle size distribution curve measured by the laser diffraction and scattering method described above within the range of the particle diameter of not less than 0.01 μm but not more than 1.00 μm. In contrast, regarding the surface layer forming solution for preparing the charging rollers (B-3) and (B-6), no peak derived from the conductive particles was verified within the range of the particle diameter of not less than 0.01 μm but not more than 1.00 μm in the particle size distribution curve measured by the laser diffraction and scattering method described above.

[Evaluation]

The charging rollers of Examples 1 to 12 and Comparative Examples 1 to 7 were used by the following method, to evaluate the generated voltage and the rotational resistance of discharge unevenness when using these charging rollers. Evaluation results are additionally illustrated in the following Tables 1 to 5.

[Uneven Discharge]

Any of the charging rollers of the Examples and the Comparative Examples to be evaluated was attached to a color multifunction printer ("TASKalfa (registered trademark) 308i", product of KYOCERA Document Solutions Inc.). Thus, an evaluation apparatus was prepared. In an environment of a temperature of 32.5° C. and a humidity of 80% RH, a halftone image (image density: 25%) was formed on a recording medium using the evaluation apparatus while changing the surface potential of the photosensitive member. It was visually verified whether or not uneven discharge (unevenness in image density) occurred in the image, and verified the charging voltage applied to the charging roller when the uneven discharge occurs. The developer and the toner used were the same as those standardly used in the above-described color multifunction printer. As the recording medium, a print sheet (copy paper "Multipaper Super White+", product of ASKUL Corporation) was used. The uneven discharge was determined in accordance with the following criteria.

(Evaluation Criteria of Uneven Discharge)

"A" (good): The charging voltage applied to the charging roller when the uneven discharge occurs is not less than 450 V.

"B" (failure): The charging voltage applied to the charging roller when the uneven discharge occurs is less than 450 V.

[Rotational Resistance]

The charging rollers of the Examples and Comparative Examples to be evaluated were left for 24 hours in an LL environment (temperature: 10.0° C., humidity: 10% RH). Then, one of the charging rollers that had been left in this LL environment was attached to the color multifunction printer ("TASKalfa (registered trademark) 308i", product of KYOCERA Document Solutions Inc.), and the charging voltage (direct current voltage) of 500 V was applied thereto in the above-described LL environment, and the charging roller was rotated at a rotational speed of 100 mm/sec to measure the rotational resistance. The rotational resistance was measured using "R8340", product of ADVANTEST CORPORATION. The reason why 500 V is used as the charging voltage for evaluating the rotational resistance is that 500 V is an appropriate voltage at which the resistance can be measured stably. If the voltage is too low, the repetition stability will be low, and if it is too high, it will be in a destructive mode.

(Evaluation Criteria of Rotational Resistance)

"A" (good): The rotational resistance is less than 6.5 log Ω.

"B" (failure): The rotational resistance is not less than 6.5 log Ω.

Table 1 is as follows. In Table 1 and FIG. 4, "EX1" indicates Example 1, "EX2" indicates Example 2, "EX3" indicates Example 3, and "EX4" indicates Example 4.

TABLE 1

| | | EX1 | EX2 | EX3 | EX4 |
|---|---|---|---|---|---|
| Charging roller | | A-1 | A-2 | A-3 | A-4 |
| Binder resin | Type | PA-100A-S | PA-100A-S | PA-100A-S | CM-8000 |
| | mass [parts] | 100.0 | 100.0 | 100.0 | 100.0 |
| | Water contact angle [°] | 116.2 | 116.2 | 116.2 | 41.7 |
| First conductive particles | Type | SEAST SO | SEAST SO | SEAST SO | SEAST SO |
| | mass [parts] | 2.5 | 5.0 | 8.0 | 16.0 |
| | Conductive agent mass ratio [%] | 3.0 | 5.9 | 9.1 | 16.7 |

TABLE 1-continued

| | | EX1 | EX2 | EX3 | EX4 |
|---|---|---|---|---|---|
| Second conductive particles | Type | SP2 | SP2 | SP2 | SP2 |
| | mass [parts] | 80.0 | 80.0 | 80.0 | 80.0 |
| | Conductive agent mass ratio [%] | 97.0 | 94.1 | 90.9 | 83.3 |
| Resin particles | Type | MZ-5HN | GR-800T | MZ-5HN | MZ-5HN |
| | mass [parts] | 50.0 | 50.0 | 50.0 | 50.0 |
| Peak (0.01 to 1.00 μm) | | Included | Included | Included | Included |
| Uneven discharge | Measured value [V] | 550 | 600 | 550 | 450 |
| | Rating | A | A | A | A |
| Rotational resistance | | A | A | A | A |

Table 2 is as follows. In Table 2 and FIG. 4, "EX5" indicates Example 5, "EX6" indicates Example 6, "EX7" indicates Example 7, and "EX8" indicates Example 8.

TABLE 2

| | | EX5 | EX6 | EX7 | EX8 |
|---|---|---|---|---|---|
| Charging roller | | A-5 | A-6 | A-7 | A-8 |
| Binder resin | Type | PA-201 | CM-8000 | PA-100A-S | PA-100A-S |
| | mass [parts] | 100.0 | 100.0 | 100.0 | 100.0 |
| | Water contact angle [°] | 84.3 | 41.7 | 116.2 | 116.2 |
| First conductive particles | Type | SEAST SO | SEAST SO | Shoblack N330 | ASAHI #78 |
| | mass [parts] | 5.0 | 5.0 | 5.0 | 5.0 |
| | Conductive agent mass ratio [%] | 5.9 | 5.9 | 5.9 | 5.9 |
| Second conductive particles | Type | SP2 | SP2 | SP2 | SP2 |
| | mass [parts] | 80.0 | 80.0 | 80.0 | 80.0 |
| | Conductive agent mass ratio [%] | 94.1 | 94.1 | 94.1 | 94.1 |
| Resin particles | Type | MZ-5HN | MZ-5HN | MZ-5HN | MZ-5HN |
| | mass [parts] | 50.0 | 50.0 | 50.0 | 50.0 |
| Peak (0.01 to 1.00 μm) | | Included | Included | Included | Included |
| Uneven discharge | Measured value [V] | 550 | 450 | 600 | 600 |
| | Rating | A | A | A | A |
| Rotational resistance | | A | A | A | A |

Table 3 is as follows. In Table 3 and FIG. 4, "EX9" indicates Example 9, "EX10" indicates Example 10, "EX11" indicates Example 11, and "EX12" indicates Example 12.

TABLE 3

| | | EX9 | EX10 | EX11 | EX12 |
|---|---|---|---|---|---|
| Charging roller | | A-9 | A-10 | A-11 | A-12 |
| Binder resin | Type | PA-100 | CM-8000 | PA-100A-S | PA-100A-S |
| | mass [parts] | 100.0 | 100.0 | 100.0 | 100.0 |
| | Water contact angle [°] | 122.7 | 41.7 | 116.2 | 116.2 |
| First conductive particles | Type | SEAST SO | SEAST SO | SEAST SO | SEAST SO |
| | mass [parts] | 10.0 | 1.0 | 2.0 | 5.0 |
| | Conductive agent mass ratio [%] | 5.3 | 1.0 | 9.1 | 3.2 |
| Second conductive particles | Type | SP2 | SP2 | SP2 | SP2 |
| | mass [parts] | 180.0 | 95.0 | 20.0 | 150.0 |
| | Conductive agent mass ratio [%] | 94.71 | 99.0 | 90.9 | 96.8 |
| Resin particles | Type | MZ-5HN | MZ-5HN | MZ-5HN | MZ-5HN |
| | mass [parts] | 50.0 | 50.0 | 50.0 | 50.0 |
| Peak (0.01 to 1.00 μm) | | Included | Included | Included | Included |
| Uneven discharge | Measured value [V] | 500 | 450 | 600 | 550 |
| | Rating | A | A | A | A |
| Rotational resistance | | A | A | A | A |

Table 4 is as follows. In Table 4 and FIG. 4, "CEX1" indicates Comparative Example 1, "CEX2" indicates Comparative Example 2, "CEX3" indicates Comparative Example 3, and "CEX4" indicates Comparative Example 4.

TABLE 4

| | | CEX1 | CEX2 | CEX3 | CEX4 |
|---|---|---|---|---|---|
| Charging roller | | B-1 | B-2 | B-3 | B-4 |
| Binder resin | Type | PA-100A-S | PA-100A-S | PA-100A-S | FR-101 |
| | mass [parts] | 100.0 | 100.0 | 100.0 | 100.0 |
| | Water contact angle [°] | 116.2 | 116.2 | 116.2 | 17.7 |
| First conductive particles | Type | SEAST SO | SEAST SO | SEAST SO | SEAST SO |
| | mass [parts] | 5.0 | 0.0 | 5.0 | 5.0 |
| | Conductive agent mass ratio [%] | 33.3 | 0.0 | 5.9 | 5.9 |
| Second conductive particles | Type | SP2 | SP2 | SP2 | SP2 |
| | mass [parts] | 10.0 | 80.0 | 80.0 | 80.0 |
| | Conductive agent mass ratio [%] | 66.7 | 100.0 | 94.1 | 94.1 |
| Resin particles | Type | MZ-5HN | MZ-5HN | MZ-5HN | MZ-5HN |
| | mass [parts] | 50.0 | 50.0 | 50.0 | 50.0 |
| Peak (0.01 to 1.00 μm) | | Included | Included | Included | Included |
| Uneven discharge | Measured value [V] | 600 | 600 | 250 | 250 |
| | Rating | A | A | B | B |
| Rotational resistance | | B | B | A | A |

Table 5 is as follows. In Table 5 and FIG. 4, "CEX5" indicates Comparative Example 5, "CEX6" indicates Comparative Example 6, and "CEX7" indicates Comparative Example 7.

TABLE 5

| | | CEX5 | CEX6 | CEX7 |
|---|---|---|---|---|
| Charging roller | | B-5 | B-6 | B-7 |
| Binder resin | Type | FR-104 | PA-100A-S | CM-8000 |
| | mass [parts] | 100.0 | 100.0 | 100.0 |
| | Water contact angle [°] | 18.9 | 116.2 | 41.7 |
| First conductive particles | Type | SEAST SO | SEAST SO | SEAST SO |
| | mass [parts] | 5.0 | 16.0 | 0.0 |
| | Conductive agent mass ratio [%] | 5.9 | 16.7 | 0.0 |
| Second conductive particles | Type | SP2 | SP2 | SP2 |
| | mass [parts] | 80.0 | 80.0 | 95.0 |
| | Conductive agent mass ratio [%] | 94.1 | 83.3 | 100.0 |
| Resin particles | Type | MZ-5HN | MZ-5HN | MZ-5HN |
| | mass [parts] | 50.0 | 50.0 | 50.0 |
| Peak (0.01 to 1.00 μm) | | Included | Not Included | Included |
| Uneven discharge | Measured value [V] | 250 | 400 | 450 |
| | Rating | B | B | A |
| Rotational resistance | | A | A | B |

FIG. 4 illustrates a relationship between the content of the first conductive particles in the conductive particles (the conductive agent mass ratio of the first conductive particles illustrated in Tables 1 to 5, referred to as the "conductive agent mass ratio" in FIG. 4, as described above) in the surface layer of each of the charging roller manufactured by the examples and some of comparative examples (specifically, Examples 1 to 12 and Comparative Examples 1, 2, and 4 to 7 related to FIG. 4) and the water contact angle of the thermoplastic resin, which is a binder resin in the surface layer of each of these charging rollers. In FIG. 4, each of the "%" indicates % by mass similarly to Tables 1 to 5. In FIG. 4, each of the "EX" indicates the Example and each of the "CEX" indicates the Comparative Example.

The charging rollers of Examples 1 to 12 each included the conductive shaft, the elastic body layer formed on the outer periphery of the conductive shaft, and the surface layer formed on the outer periphery of the elastic body layer. The surface layer contained the binder resin and the conductive particles. The binder resin contained only the thermoplastic resin. The conductive particles contained the first conductive particles and the second conductive particles. The first conductive particles were carbon black particles. The particle size distribution of the conductive particles had the peak within the range of not less than 0.01 μm but not more than 1 μm.

Moreover, as illustrated in FIG. 4, the charging rollers of Examples 1 to 12 each satisfied the above-described expressions (1) to (3), where y is the water contact angle of the thermoplastic resin and x is the content of the first conductive particles (conductive agent mass ratio) in the conductive particles of the surface layer.

In other words, the values x and y of the charging rollers of Examples 1 to 12 were located within a region surrounded by the straight line expressed by the following expressions (I) to (III).

$$y = 40 \quad \text{(I)}$$

$$y = (800/27)x + (280/9) \quad \text{(II)}$$

$$y = -8x + 200 \quad \text{(III)}$$

In the charging rollers of Examples 1 to 12, no uneven discharge occurred when the charging voltage was less than 450 V, and the rotational resistance was less than 6.5 log Ω when the charging voltage (direct current voltage) of 500 V was applied in the LL environment. Therefore, the effect of suppressing uneven discharge in the formed image was high, and uneven discharge had been sufficiently suppressed.

In contrast, the charging rollers of Comparative Examples 1, 2, and 4 to 7 did not satisfy the expressions (1) to (3), as illustrated in FIG. 4. Therefore, in the charging rollers of Comparative Examples 1, 2, and 4 to 7, the rotational resistance is high, or the discharge unevenness occurred at a low charging voltage, and the discharge unevenness could not be sufficiently suppressed.

Moreover, in the charging rollers of Comparative Examples 3 and 6, the particle size distribution of the conductive particles did not have a peak within the range of not less than 0.01 μm but not more than 1.00 μm. Therefore, in the surface layer forming solutions of Comparative Examples 3 and 6, the conductive particles quickly aggregated, and the dispersed state of the conductive particles could only be maintained for a short period of time, or the dispersion was difficult to progress, each of which made it impossible to obtain the surface layer in which the conductive particles were sufficiently dispersed. Therefore, in each of the charging rollers of Comparative Examples 3 and 6, uneven discharge occurred when the charging voltage was less than 450 V. Therefore, it can be seen from Comparative Examples 3 and 6 that when the particle size distribution of the conductive particles does not have a peak within the range of not less than 0.01 μm but not more than 1.00 μm, uneven discharge occurs at a low charging voltage, and the uneven discharge cannot be sufficiently suppressed.

The water contact angle of the binder resin in each of the charging rollers of Comparative Examples 4 and 5 was less than 40°. Therefore, in each of the charging rollers of Comparative Examples 4 and 5, uneven discharge occurred when the charging voltage was less than 450 V. Therefore, it can be seen from Comparative Examples 4 and 5 that when the water contact angle of the binder resin is less than 40°, uneven discharge occurs even at a low charging voltage, and the uneven discharge cannot be sufficiently suppressed.

Moreover, each of the charging rollers of Comparative Examples 2 and 7 contained only the second conductive particles (metal oxide particles) as the conductive particles and did not contain the first conductive particles (carbon black), and therefore had high rotational resistance. According to Comparative Examples 2 and 7, it can be seen that when the conductive particles do not contain the first conductive particles, the rotational resistance is increased.

According to the present disclosure, it is possible to provide a charging roller capable of sufficiently suppressing the occurrence of uneven discharge and having a low rotational resistance, and a process cartridge, an image forming apparatus, and an image forming method using the above-described charging roller.

The charging roller and the process cartridge according to the present disclosure can be used as components of the image forming apparatus. The image forming apparatus and the image forming method according to the present disclosure can be used to form an image on a recording medium.

What is claimed is:

1. A charging roller comprising:
a conductive shaft;
an elastic body layer formed on an outer periphery of the conductive shaft; and
a surface layer formed on an outer periphery of the elastic body layer, wherein
the surface layer contains a binder resin and conductive particles,
the binder resin contains only a thermoplastic resin,
the conductive particles contain first conductive particles and second conductive particles,
the first conductive particles are carbon black particles,
a particle size distribution of the conductive particles has at least one peak within a range of not less than 0.01 μm but not more than 1 μm, and
a water contact angle of the thermoplastic resin and a content of the first conductive particles in the conductive particles satisfy expressions (1) to (3):

$$40 \leq y \quad (1)$$

$$y \leq (800/27)x + (280/9) \quad (2)$$

$$y \leq -8x + 200 \quad (3)$$

(where, y denotes the water contact angle of the thermoplastic resin, and x denotes the content of the first conductive particles in the conductive particles, in the expressions (1) to (3)).

2. The charging roller according to claim 1, wherein
the second conductive particles are metal oxide particles.

3. The charging roller according to claim 1, wherein
the x is not less than 0.3% by mass but not more than 20.0% by mass.

4. The charging roller according to claim 1, wherein
the thermoplastic resin is a thermoplastic polyamide resin.

5. The charging roller according to claim 1, wherein
a content of the conductive particles in the surface layer is not less than 15.3 parts by mass but not more than 230.0 parts by mass with respect to 100.0 parts by mass of the binder resin.

6. The charging roller according to claim 1, wherein
the surface layer further contains resin particles.

7. The charging roller according to claim 6, wherein
the resin particles are acrylic resin particles.

8. The charging roller according to claim 6, wherein
a content of the resin particles in the surface layer is not less than 20.0 parts by mass but not more than 80.0 parts by mass with respect to 100.0 parts by mass of the binder resin.

9. A process cartridge configured to be detachably attached to an image forming apparatus, wherein
the process cartridge comprises the charging roller according to claim 1.

10. An image forming apparatus comprising:
an image bearing member;
a charging device configured to charge a surface of the image bearing member;
an exposure device configured to expose the charged surface of the image bearing member and to form an electrostatic latent image on the surface of the image bearing member;

a development device configured to develop the electrostatic latent image as a toner image; and a transfer device configured to transfer the toner image from the image bearing member to a transfer target, wherein the charging device is the charging roller according to claim 1.

11. The image forming apparatus according to claim 10, wherein the image bearing member is a positively chargeable single-layer photosensitive member.

12. An image forming method comprising a charging step of charging a surface of an image bearing member by a charging device, wherein the charging device is the charging roller according to claim 1.

* * * * *